(12) United States Patent
Wang

(10) Patent No.: US 9,085,473 B2
(45) Date of Patent: Jul. 21, 2015

(54) LIQUID DESALINATION DEVICE

(71) Applicants: Tzu Wang, Taoyuan County (TW);
Chin-Wen Wang, Taoyuan County (TW)

(72) Inventor: Chin-Wen Wang, Taoyuan County (TW)

(73) Assignee: HABEMIT INTERNATIONAL CO. LTD., Taoyuan County (TW)

( * ) Notice: Subject to any disclaimer, the term of this patent is extended or adjusted under 35 U.S.C. 154(b) by 180 days.

(21) Appl. No.: 14/041,683

(22) Filed: Sep. 30, 2013

(65) Prior Publication Data
US 2015/0089962 A1 Apr. 2, 2015

(51) Int. Cl.
C02F 1/22 (2006.01)
C02F 103/08 (2006.01)

(52) U.S. Cl.
CPC .............. *C02F 1/22* (2013.01); *C02F 2103/08* (2013.01)

(58) Field of Classification Search
CPC ........ C02F 1/22; C02F 2103/08; C02F 1/444; C02F 1/048; C02F 1/442; C02F 9/00; C02F 1/42; C02F 1/78
USPC .................... 62/3.63, 340, 123, 344
See application file for complete search history.

(56) References Cited

U.S. PATENT DOCUMENTS

| | | | |
|---|---|---|---|
| 4,370,865 A * | 2/1983 | Hibino et al. .................... 62/124 |
| 4,646,526 A * | 3/1987 | Garland ............................. 62/66 |
| 4,704,877 A * | 11/1987 | Selcukoglu ...................... 62/532 |
| 5,123,948 A * | 6/1992 | Ruff ................................ 62/532 |
| 5,383,342 A * | 1/1995 | El-Boher et al. ................ 62/532 |
| 5,400,619 A * | 3/1995 | Husseiny et al. ............... 62/532 |
| 5,513,494 A * | 5/1996 | Flynn et al. ................... 60/641.7 |
| 5,953,924 A * | 9/1999 | Li et al. ............................. 62/71 |
| 6,294,054 B1 * | 9/2001 | Sutter .......................... 202/176 |
| 6,688,117 B1 * | 2/2004 | Ophir ................................ 62/74 |
| 7,013,669 B2 * | 3/2006 | Ophir et al. ..................... 62/401 |
| 7,059,140 B2 * | 6/2006 | Zevlakis .......................... 62/66 |
| 7,866,179 B2 * | 1/2011 | Ophir et al. ..................... 62/268 |
| 2003/0159457 A1 * | 8/2003 | Faqih .............................. 62/285 |
| 2004/0237564 A1 * | 12/2004 | Zevlakis ......................... 62/340 |
| 2009/0100857 A1 * | 4/2009 | Ophir et al. ..................... 62/347 |
| 2010/0294266 A1 * | 11/2010 | Fung ............................. 126/688 |

* cited by examiner

*Primary Examiner* — Mohammad M Ali
(74) *Attorney, Agent, or Firm* — Chun-Ming Shih; HDLS IPR Services

(57) ABSTRACT

A liquid desalination device includes an ice maker, a rotary tank, an impurities collection tank and a desalination collection tank. The ice maker has a freezer module, a liquid inlet and an ice outlet. The liquid inlet and the liquid outlet correspond to the freezer module in position. The rotary tank has a tank body with a plurality of through holes, an ice inlet and an egress. The ice inlet and the egress are located at two end of the tank body. The ice inlet corresponds to the ice outlet in position. The impurities collection tank is disposed around the tank body, and corresponding to the through holes in position. The desalination collection tank corresponds to the ice outlet in position.

10 Claims, 4 Drawing Sheets

LIQUID DESALINATION DEVICE

BACKGROUND OF THE INVENTION

1. Technical Field

The invention relates to liquid processors, particularly to liquid desalination devices.

2. Related Art

Water is an essential element for human being. However, because of more and more serious water pollution, clean water becomes less and less. Clean water is much less than non-clean water in quantity. Saving clean water is critical for all mankind Polluted water or wastewater contains sludge and seawater contains salt, so they cannot be used for cleaning Thus desalination of polluted water, wastewater and seawater becomes a serious issue to be overcome.

SUMMARY OF THE INVENTION

An object of the invention is to provide a liquid desalination device, which can desalinate seawater, polluted water and wastewater to generate clean water.

To accomplish the above object, the liquid desalination device of the invention includes an ice maker, a rotary tank, an impurities collection tank and a desalination collection tank. The ice maker has a freezer module, a liquid inlet and an ice outlet. The liquid inlet and the liquid outlet correspond to the freezer module in position. The rotary tank has a tank body with a plurality of through holes, an ice inlet and an egress. The ice inlet and the egress are located at two end of the tank body. The ice inlet corresponds to the ice outlet in position. The impurities collection tank is disposed around the tank body, and corresponding to the through holes in position. The desalination collection tank corresponds to the ice outlet in position.

DETAILED DESCRIPTION OF THE INVENTION

Figure 1:
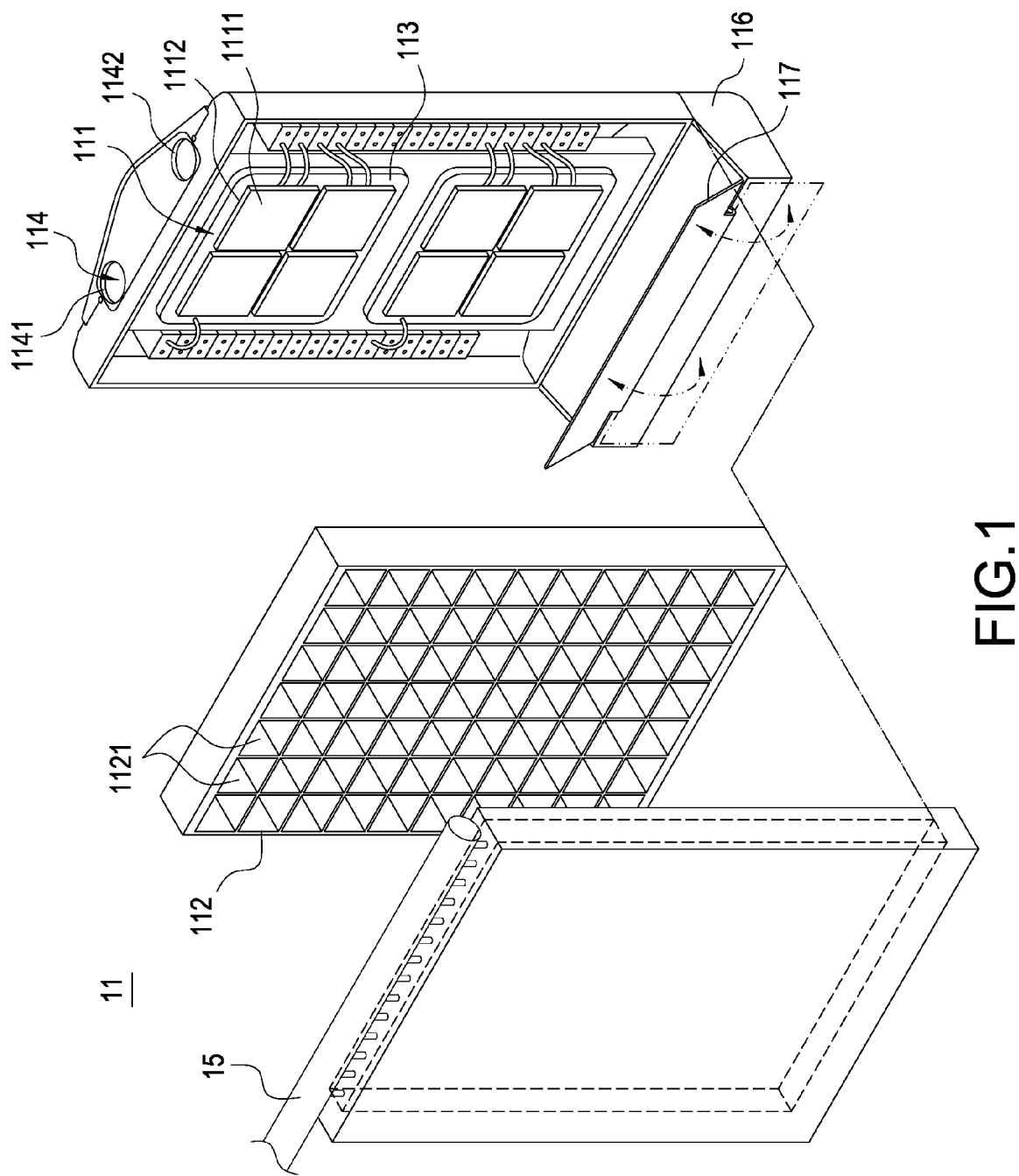
FIG. 1 is an exploded view of the freezer module of the invention.

Please refer to FIGS. 1-4. The liquid desalination device 10 of the invention includes an ice maker 1, a rotary tank 2, an impurities collection tank 3 and a desalination collection tank 4.

Figure 2:
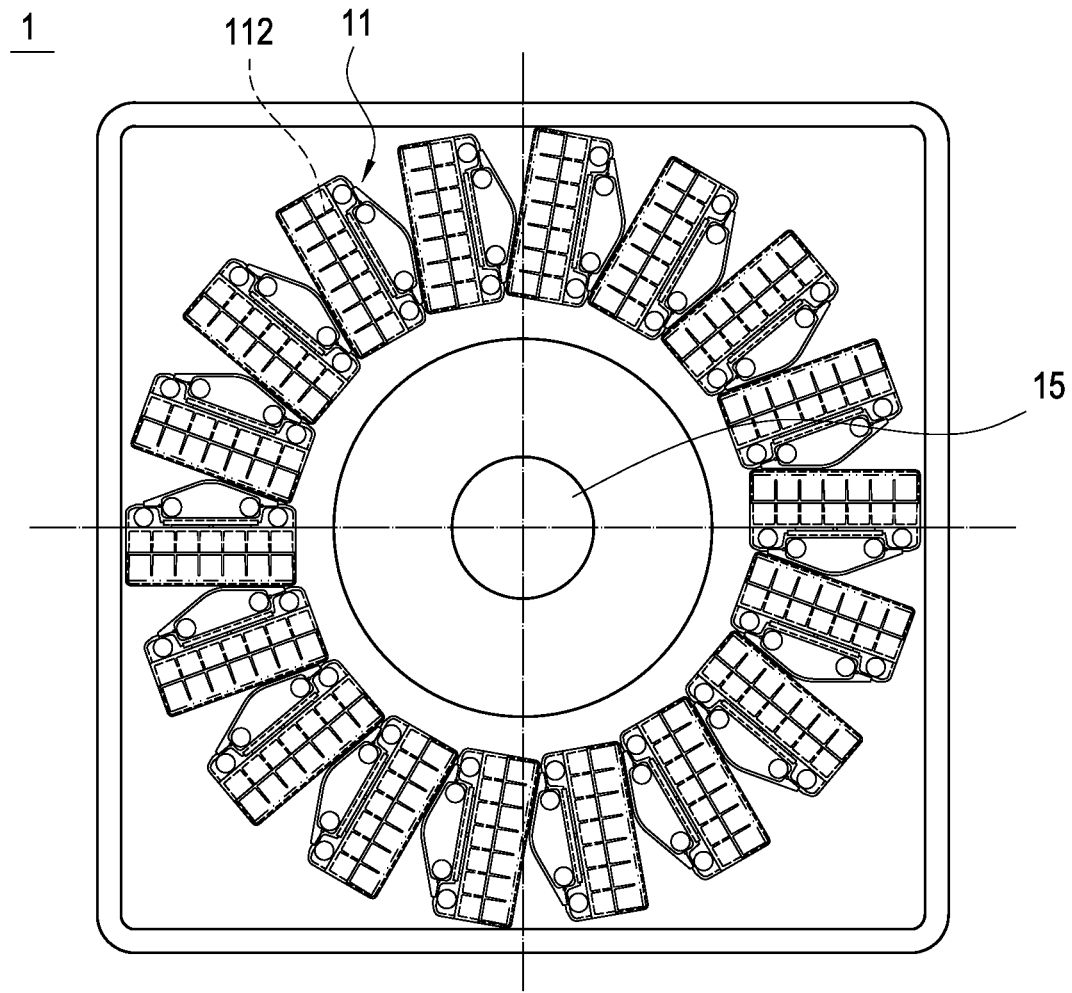
FIG. 2 is a top plan view of the invention.
Figure 3:
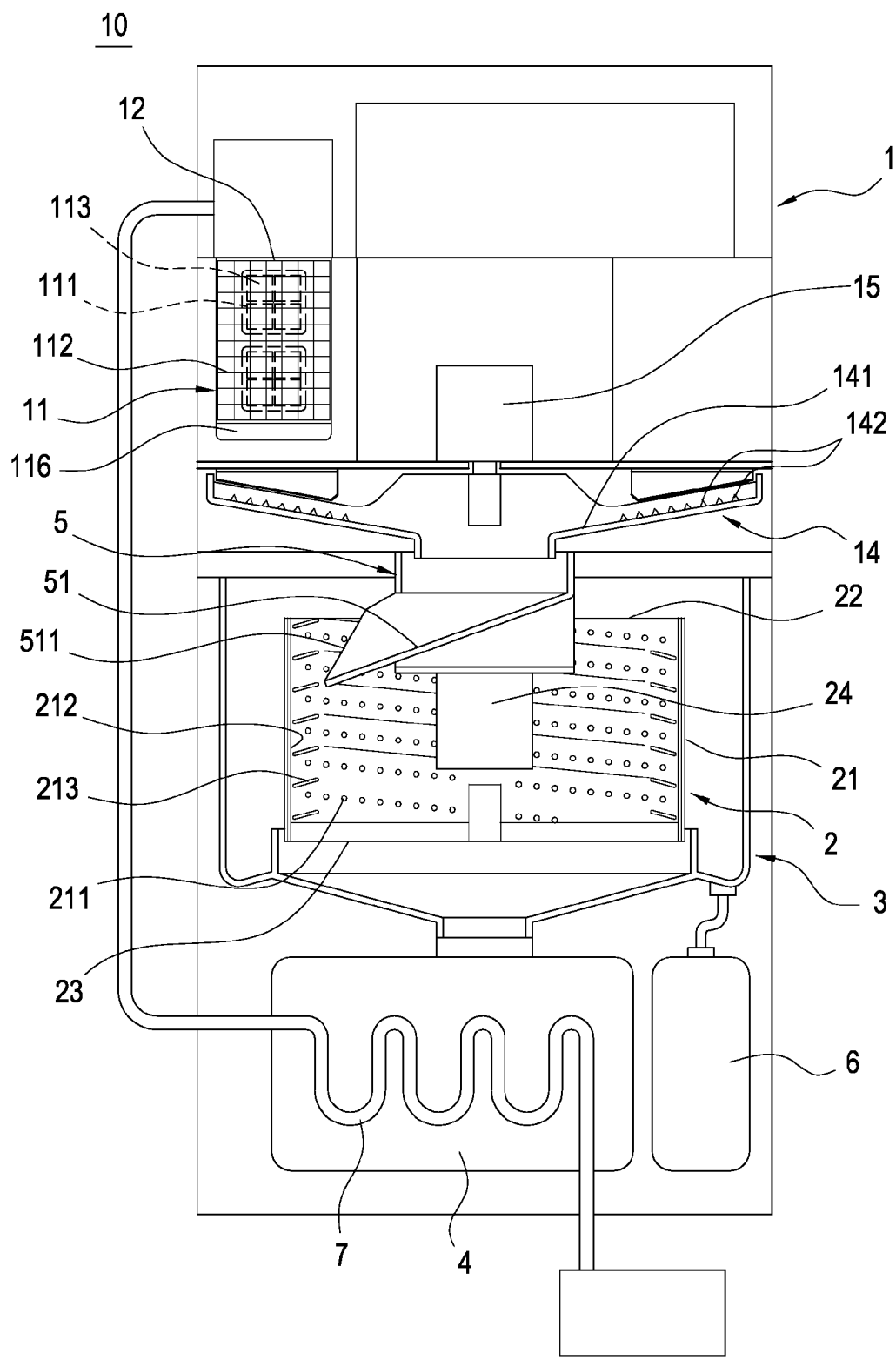
FIG. 3 is a side schematic view of the invention.

The ice maker 1 has one or more freezer modules 11, a liquid inlet 12 and an ice outlet 13. As shown in FIG. 2, preferably, the ice maker 11 is more than one in quantity.

The ice maker 1 further includes an ice tray 14 and a motor 15. The ice tray 14 corresponds to the freezer module 11 in position. The ice outlet 13 is located over the ice tray 14. The ice tray 14 is formed with an inclined bottom 141 with teeth 142. The motor 15 connects and rotates the ice tray 14.

As shown in FIG. 1, the freezer module 11 includes at least one thermoelectric cooling chip 111, an ice grid frame 112, at least one vapor chamber 113, a cooling pipe 114, a drip tube 115, an ice box 116 and a rotary board 117.

The thermoelectric cooling chip 111 has a heat absorber side 1111 and a heat emitter side 1112. The ice grid frame 112 has a plurality of grids 1121 corresponding to the heat absorber side 1111. The vapor chamber 113 and the cooling pipe 114 abut against the heat emitter side 1112. The drip tube 115 connects the liquid inlet 12 and located over the ice grid frame 112. The cooling pipe 114 has a water inlet 1142 and a water outlet 1142 for guiding cooling water to flow in and out the cooling pipe 114.

The ice box 116 is arranged under the ice grid frame 112. The rotary board 117 is pivoted to the ice box 116 and is outwardly rotatable against the thermoelectric cooling chip 111. The liquid, such as seawater, polluted water and wastewater, poured through the liquid inlet 12 will be frozen in the ice grid frame 112 and some non-frozen liquid will flow into the ice box 116. When the ice cubes 100 drop down to the rotary board 117, the rotary board 117 will be turned to drop the ice cubes 100 down.

The rotary tank 2 has a tank body 21 with a plurality of through holes 211, an ice inlet 22 and an egress 23. The ice inlet 22 and the egress 23 are located at two end of the tank body 21. The ice inlet 22 corresponds to the ice outlet 13 in position. The tank body 21 has an inner side wall 212. A spiral passage 213 is axially formed on the inner side wall 212.

Additionally, the rotary tank 2 includes a motor 24 connecting and rotating the tank body 21.

The impurities collection tank 3 is disposed around the tank body 21 and corresponds to the through holes 211 in position. The desalination collection tank 4 corresponds to the ice outlet 23 in position.

The invention further includes a funnel 5 located between the ice outlet 13 and ice inlet 22. The bottom of the funnel 5 is provided with an inclined guide plate 51. An opening 511 of the inclined guide plate 51 is located near the top of the inner side wall 212.

The invention further includes an impurities storage tank 6 under the impurities collection tank 3.

The invention further includes a liquid tube 7 thermally attached on the desalination collection tank 4 and connecting the liquid inlet 12.

Figure 4:
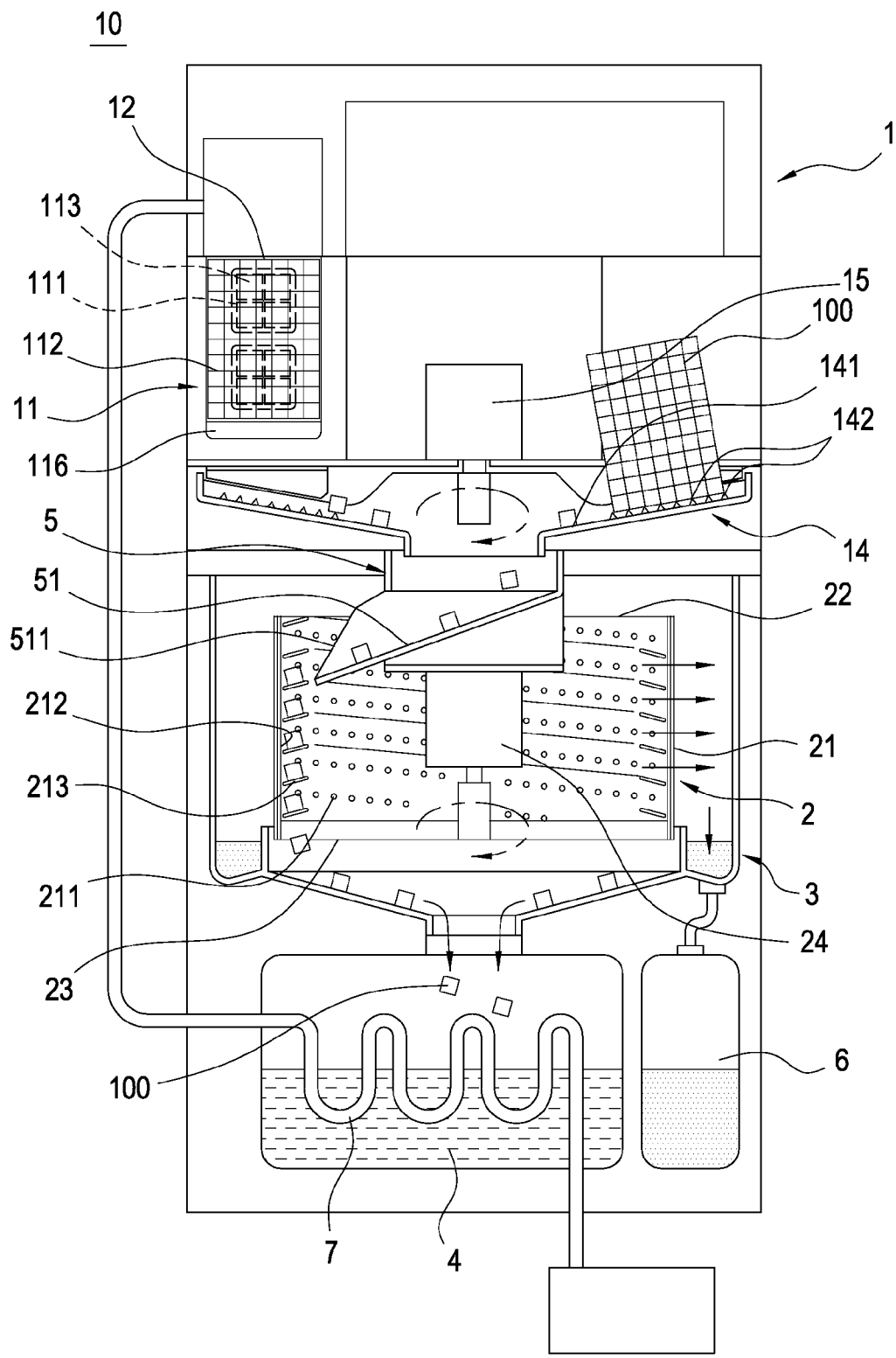
FIG. 4 is a schematic view of the invention in use.

As shown in FIG. 4, original liquid such as seawater, polluted water or wastewater is poured through the liquid inlet 12 and frozen by the freezer module 11 to be ice cubes 100. As a result, impurities such as salt and sand will be formed on the ice cubes 100. Then, the ice cubes 100 enter the rotary tank 2 through the ice outlet 13 and the ice inlet 22. By rotation of the rotary tank 2, the impurities will be scraped from the ice cubes 100 to the impurities collection tank 3 due to friction between the inner side wall 212 and the ice cubes 100. Finally, the ice cubes 100 through the egress 23 into the desalination collection tank 4 do not contain impurities. Thus ice cubes 100 will become clean water.

The inclined bottom 141 of the ice tray 14 can guide the ice cubes 14 into the ice outlet 13. When the ice tray 14 is rotated by the motor 15, the teeth 142 will poke ice cubes 100 which adhere to each other to make them separate. Thus impurities on the ice cubes 100 can be scraped more completely.

The ice cubes 100 are moved along the spiral passage 213. Such an elongated passage can make impurities on the ice cubes 100 scraped more completely.

The inclined guide plate 51 can guide the ice cubes 100 to drop to the top of the spiral passage 213. This can elongate length of the passage on which the ice cubes 100 move.

The original liquid to be desalinated makes a heat exchange with the desalination collection tank 4 first, then the cooled liquid is guided by the liquid tube 7 into the liquid inlet 12. This can promote the liquid in the liquid inlet 12 to be frozen and the ice cubes 100 in the desalination collection tank 4 can be heated up to be liquefied. Thus performance of the liquid desalination device 10 can be improved.

While the forgoing is directed to a preferred embodiment of the present invention, other and further embodiments of the invention may be devised without departing from the basic scope thereof. As such, the appropriate scope of the invention is to be determined according to the claims.

What is claimed is:

1. A liquid desalination device comprising:
   an ice maker, having a freezer module, a liquid inlet and an ice outlet, wherein the liquid inlet and the liquid outlet correspond to the freezer module in position;
   a rotary tank, having a tank body with a plurality of through holes, an ice inlet and an egress, wherein the ice inlet and the egress are located at two end of the tank body, and the ice inlet corresponds to the ice outlet in position;
   an impurities collection tank, disposed around the tank body, and corresponding to the through holes in position; and
   a desalination collection tank, corresponding to the ice outlet in position.

2. The liquid desalination device of claim 1, wherein the freezer module further comprises at least one thermoelectric cooling chip, an ice grid frame, at least one vapor chamber, a cooling pipe and a drip tube, the thermoelectric cooling chip has a heat absorber side and a heat emitter side, the ice grid frame has a plurality of grids corresponding to the heat absorber side, the vapor chamber and the cooling pipe abut against the heat emitter side, and the drip tube connects the liquid inlet and located over the ice grid frame.

3. The liquid desalination device of claim 2, wherein the freezer module further comprises an ice box and a rotary board, the ice box is arranged under the ice grid frame, and the rotary board is pivoted to the ice box and is outward rotatable against the thermoelectric cooling chip.

4. The liquid desalination device of claim 2, wherein the ice maker further comprises an ice tray, the ice tray corresponds to the freezer module in position, the ice outlet is located over the ice tray, and the ice tray is formed with an inclined bottom with teeth.

5. The liquid desalination device of claim 4, wherein the ice maker further comprises a motor connecting and rotating the ice tray.

6. The liquid desalination device of claim 1, further comprising a funnel located between the ice outlet and ice inlet, wherein a bottom of the funnel is provided with an inclined guide plate, and an opening of the inclined guide plate is located near a top of an inner side wall of the tank body.

7. The liquid desalination device of claim 1, wherein a spiral passage is axially formed on an inner side wall of the tank body.

8. The liquid desalination device of claim 1, wherein the rotary tank comprises a motor connecting and rotating the tank body.

9. The liquid desalination device of claim 1, further comprising an impurities storage tank under the impurities collection tank.

10. The liquid desalination device of claim 1, further comprising a liquid tube thermally attached on the desalination collection tank and connecting the liquid inlet.

* * * * *